(12) United States Patent
Wang et al.

(10) Patent No.: US 11,906,891 B2
(45) Date of Patent: Feb. 20, 2024

(54) PROJECTION SCREEN AND PROCESSING METHOD THEREFOR

(71) Applicant: APPOTRONICS CORPORATION LIMITED, Guangdong (CN)

(72) Inventors: Lin Wang, Guangdong (CN); Wei Sun, Guangdong (CN); Jie Wang, Guangdong (CN); Fei Hu, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 271 days.

(21) Appl. No.: 17/286,444

(22) PCT Filed: Sep. 26, 2019

(86) PCT No.: PCT/CN2019/108004
§ 371 (c)(1),
(2) Date: Apr. 16, 2021

(87) PCT Pub. No.: WO2020/078189
PCT Pub. Date: Apr. 23, 2020

(65) Prior Publication Data
US 2021/0389657 A1 Dec. 16, 2021

(30) Foreign Application Priority Data
Oct. 18, 2018 (CN) .......................... 201811215452.6

(51) Int. Cl.
*G03B 21/60* (2014.01)
*G02B 3/00* (2006.01)
(Continued)

(52) U.S. Cl.
CPC ........... *G03B 21/60* (2013.01); *G02B 3/0012* (2013.01); *G02B 5/22* (2013.01); *G03B 21/602* (2013.01); *G02B 1/04* (2013.01)

(58) Field of Classification Search
CPC ......... G03B 21/60; G03B 21/602; G02B 3/08
See application file for complete search history.

(56) References Cited

U.S. PATENT DOCUMENTS

| 6,023,369 A * | 2/2000 | Goto .................... G03B 21/602 |
| | | 359/449 |
| 2005/0200952 A1 | 9/2005 | Niwa et al. |

(Continued)

FOREIGN PATENT DOCUMENTS

| CN | 1670618 A | 9/2005 |
| CN | 1693989 A | 11/2005 |

(Continued)

OTHER PUBLICATIONS

ISA China National Intellectual Property Administration, International Search Report Issued in Application No. PCT/CN2019/108004, dated Dec. 27, 2019, WIPO, 7 pages.

(Continued)

*Primary Examiner* — Christopher E Mahoney
(74) *Attorney, Agent, or Firm* — McCoy Russell LLP

(57) ABSTRACT

A projection screen and a processing method therefor, wherein the projection screen comprises, in sequence from the incident side of projection light, a diffusion layer, a microlens array and a substrate. The inner side of the substrate is provided with a Fresnel microstructure, and part of the surface of the Fresnel microstructure is provided with a reflecting layer while the remaining part of the surface is a light absorbing layer. The microlens array is used for focusing the projection light on the reflecting layer. The reflecting layer is used for reflecting projection light back to the field of view of viewers. Ambient light is mostly absorbed by the light absorbing layer. The settings of the structure and dimension of the microlens array enable the projection light to be only incident onto the reflecting layer (Continued)

of the Fresnel microstructure and the ambient light to be mostly absorbed by the light absorbing layer.

18 Claims, 6 Drawing Sheets

(51) Int. Cl.
    *G03B 21/602*     (2014.01)
    *G02B 5/22*     (2006.01)
    *G02B 1/04*     (2006.01)

(56) References Cited

U.S. PATENT DOCUMENTS

| | | | |
|---|---|---|---|
| 2014/0036359 | A1 | 2/2014 | Jeon et al. |
| 2015/0362832 | A1* | 12/2015 | Chuang ............... G03B 21/602 |
| | | | 359/455 |

FOREIGN PATENT DOCUMENTS

| | | | | | |
|---|---|---|---|---|---|
| CN | 1866055 | A | | 11/2006 | |
| CN | 102012617 | A | | 4/2011 | |
| CN | 104076589 | A | | 10/2014 | |
| CN | 105204282 | A | | 12/2015 | |
| CN | 105408777 | A | | 3/2016 | |
| CN | 106154730 | A | | 11/2016 | |
| CN | 107250896 | A | | 10/2017 | |
| CN | 107430220 | A | | 12/2017 | |
| CN | 207216263 | U | | 4/2018 | |
| CN | 108153102 | A | | 6/2018 | |
| EP | 1302787 | A2 | | 4/2003 | |
| EP | 2696243 | A2 | | 2/2014 | |
| JP | H0511346 | A | | 1/1993 | |
| JP | 2005266262 | A | | 9/2005 | |
| JP | 2008181046 | A | | 8/2008 | |
| JP | 2012252228 | A | | 12/2012 | |
| JP | 2014071278 | A | * | 4/2014 | ............ G03B 21/60 |
| KR | 20100025199 | A | * | 3/2010 | ............ G03B 21/60 |
| WO | WO-2019201012 | A1 | * | 10/2019 | ............ G03B 21/60 |

OTHER PUBLICATIONS

State Intellectual Property Office of the People's Republic of China, Office Action and Search Report Issued in Application No. 201811215452.6, dated May 8, 2021, 21 pages. (Submitted with Partial Translation).

* cited by examiner

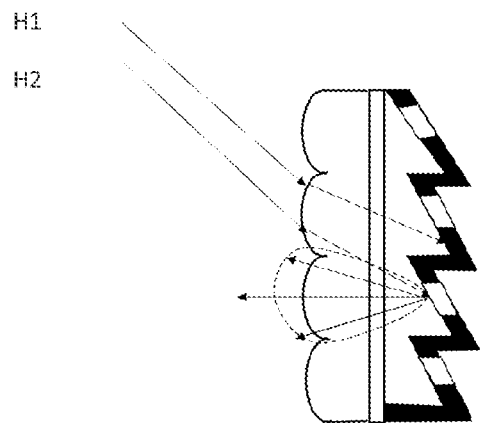
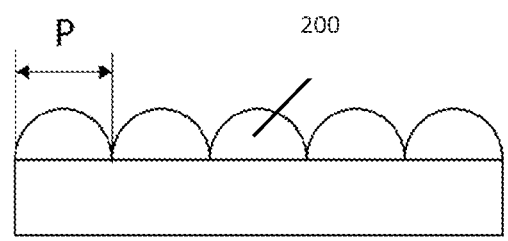
FIG. 4  FIG. 5(a)
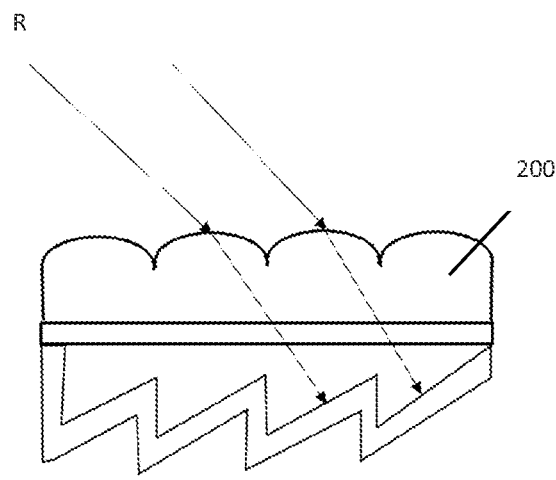
FIG. 5(b)

PROJECTION SCREEN AND PROCESSING METHOD THEREFOR

CROSS REFERENCE TO RELATED APPLICATIONS

The present application is a U.S. National Phase of International Application No. PCT/CN2019/108004 entitled "PROJECTION SCREEN AND PROCESSING METHOD THEREFOR," and filed on Sep. 26, 2019. International Application No. PCT/CN2019/108004 claims priority to Chinese Patent Application No. 201811215452.6 filed on Oct. 18, 2018. The entire contents of each of the above-listed applications are hereby incorporated by reference for all purposes.

TECHNICAL FIELD

The present disclosure relates to a projection screen and a processing method thereof.

BACKGROUND

The screen is an important factor that affects the projection display system, and it has great impact on the image quality of the projection display. Further, the contrast of the screen is a parameter to evaluate the quality of a screen. The contrast of the picture reflected by the screen is affected by the ambient light and is much lower than the contrast of the projector itself. This is because the common screen of the projector can reflect light of the projector as well as the ambient light.

In order to improve the contrast of the screen in the presence of the ambient light, the current anti-ambient light projection screen is a wire grid screen disclosed in the publication CN1670618A. The structure of the wire grid screen is shown in FIG. 2(a). The microstructure unit is composed of upper and lower inclined surfaces. An upper inclined surface is coated with a layer of black light-absorbing material to absorb ambient light above the screen. The base material is white reflective resin to reflect the light emitted from the projector. That is, the contrast under the ambient light is improved by absorbing light by one surface and reflecting light by another surface, but this type of screen has a lower gain.

The publication CN1693989A discloses a reflective screen, of which a structural unit is shown in FIG. 2(b). The structure of the reflective screen is similar to the structure of the screen in the above publication CN1670618A, but the base material of the reflective screen is black and the inclined surface of the projector is coated with a layer of white reflective material to reflect the light emitted from the projector. The wire grid structure can only collimate the incident light traveling through the middle cross section of the projector, and the collimation effect gradually deteriorates from the middle to the two sides. In order to adopt the wire grid structure, the reflective coating is selected to be a white diffuse reflection coating, which has no selectivity for the angle of the incident light. This has the advantage of increasing the field of view, but the ambient light incident to the white reflective surface can also be reflected to the field of view of the audience, and the gain of the screen is generally less than 0.5.

The publication CN105408777A discloses a circular symmetrical Fresnel structure, as shown in FIG. 2(c). This application can improve the contrast since the projected light and the ambient light have different incident angles. The ambient light G2 is reflected to the ground through the upper reflective surface of the reflective layer, which does not affect the viewing contrast. However, a part of the ambient light G1 shown in the figure will be reflected back into the field of view through the lower reflective surface of the reflective layer. Therefore, the structure in this application has limited influence on improvement of the contrast.

SUMMARY

A projection screen includes a diffusion layer, a microlens array, and a substrate that are arranged sequentially from an incident side of projection light. An inner side of the substrate is provided with an Fresnel microstructure. A part of a surface of the Fresnel microstructure is provided with reflective layers, and a remaining part of the surface of the Fresnel microstructure is provided with light-absorbing layers. The microlens array is configured to focus the projection light on the reflective layers, and the reflective layers are configured to reflect the projection light back to a field of view of a viewer.

The present disclosure provides a processing method for the projection screen as described above, which includes:
forming the microlens array, which includes processing the microlens array on a transparent substrate by using an ion exchange process, a photosensitive glass process, a holographic process, an Fresnel zone lens process, or a photoresist-thermal fusion process;
forming an Fresnel reflective structure, which includes forming the Fresnel microstructure, by an imprinting process or UV glue transferring process, on a side of the transparent substrate that is opposite to another side of the transparent substrate where the microlens array is formed, uniformly coating a preformed white reflective paint on a surface of the Fresnel microstructure, then irradiating the white reflective coating material with light beams to cure a part of the white reflective coating material irradiated by the light beams, an irradiation direction of the light beams being orientated in an incident direction of light emitted from a projector, and removing another part of the white reflective coating material that is not irradiated by the light beams; and
forming the light-absorbing layers, which includes adding a black organic dye and an inorganic pigment in a UV glue, coating a formed black absorbing material on a part of the surface of the Fresnel microstructure where the another part of the white reflective coating material non-irradiated by the light beams is removed, and obtaining a main structure of the projection screen through light-curing.

BRIEF DESCRIPTION OF DRAWINGS

FIG. 4 is a principle diagram of improving contrast according to the present disclosure;

FIGS. 5(a) to 5(d) are schematic diagrams illustrating a first processing method according to the present disclosure;

DESCRIPTION OF EMBODIMENTS

Figure 1A:
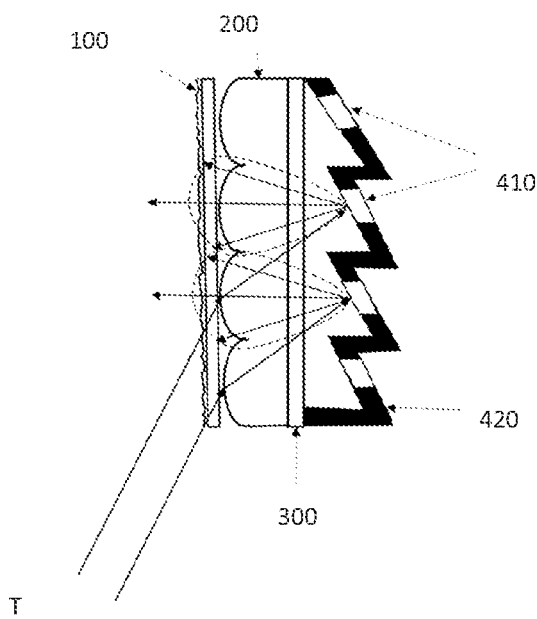
FIG. 1(a) is a schematic diagram illustrating light emitted from a projector according to the present disclosure.
Figure 1B:
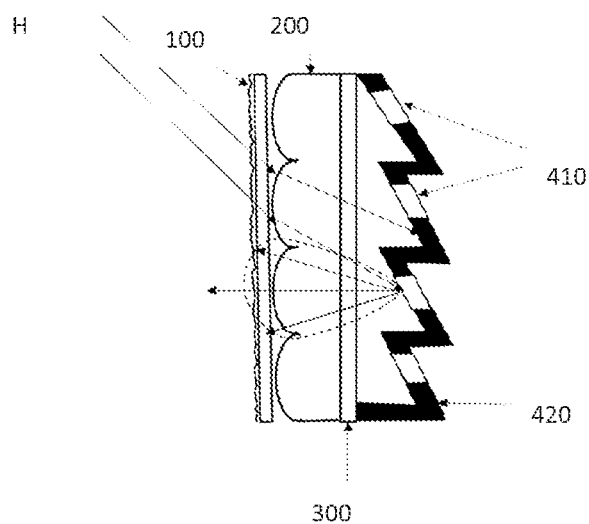
FIG. 1(b) is a schematic diagram illustrating ambient light according to the present disclosure.
Figure 1C:
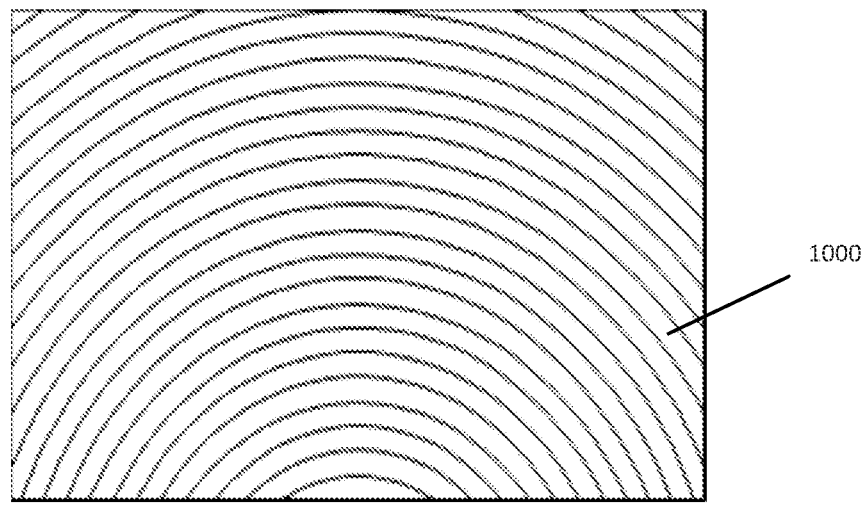
FIG. 1(c) is a schematic diagram illustrating a profile of a projection screen according to the present disclosure.
Figure 2A:
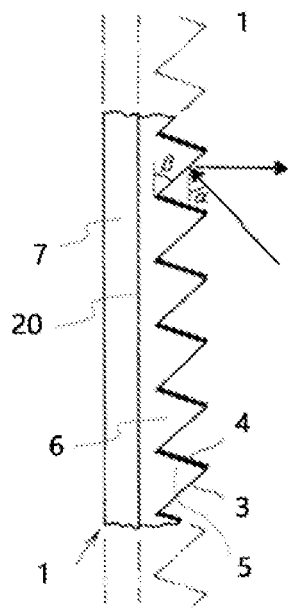
FIGS. 2(a) to 2(c) are schematic diagrams of the related art, respectively.
Figure 2B:
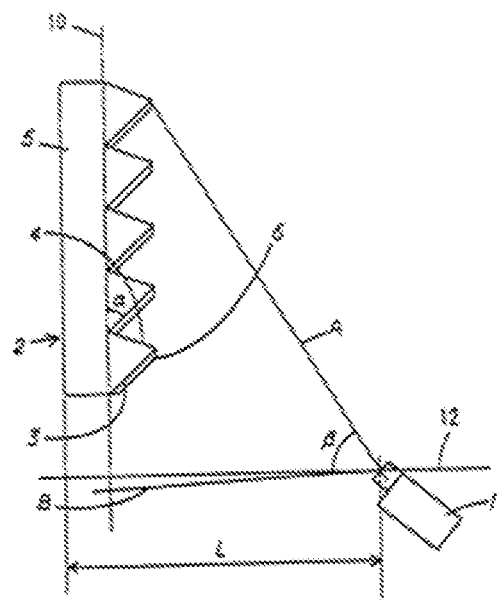
Figure 2C:
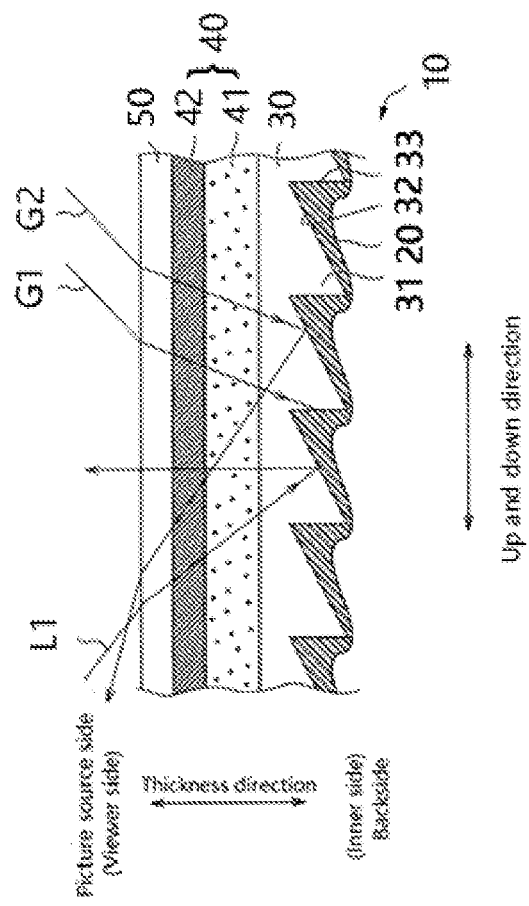

FIG. 1(a) is a schematic diagram of light emitted from a projector according to the present disclosure, FIG. 1(b) is a schematic diagram of ambient light according to the present disclosure, and FIG. 1(c) is a schematic diagram of a profile of a projection screen according to the present disclosure. Referring to FIGS. 1(a) to 1(c), the present disclosure provides a projection screen 1000 including a diffusion layer 100, a microlens array 200, and a substrate 300, which are arranged sequentially from an incident side of projection light T. An inner side of the substrate 300 is provided with a Fresnel microstructure 400, and a part of a surface of the Fresnel microstructure 400 is provided with reflective layers 410, a remaining part of the surface of the Fresnel microstructure 400 is provided with light-absorbing layers 420. The microlens array 200 is configured to focus the projection light T on the reflective layers 410, and the reflective layers 410 are configured to reflect the projection light back to a field of view G of viewers. Most of the ambient light H is absorbed by the light-absorbing layers 420.

Specifically, the reflective layers 410 and the light-absorbing layers 420 are provided on the surface of the Fresnel microstructure 400, and one of the reflective layers 410 is provided between two adjacent light-absorbing layers 420. The reflective layer 410 is a white reflective coating material, and includes reflective particles, diffusion particles, negative photoresist, adhesive glue, and auxiliary material. The light-absorbing layer 420 mainly includes UV glue, and black organic dye and inorganic pigment are added to the UV glue. The microlens array 200 arranged on the substrate 300 has a rotational symmetry structure which has a shape of arcs.

Considering processing convenience, the diffusion layer 100 may be a layer structure attached to an outer side of the microlens array 200. Alternatively, the outer side of the microlens array 200 is a side close to the viewer that is roughened to form the diffusion layer 100. A pitch P of each of microlens units of the microlens array 200 may be 100 μm according to requirements.

Further, the microlens array 200 may include a plurality of microlenses, and each of the reflective layers 410 may be arranged at a position corresponding to a focal plane of a respective microlens unit of the microlens units.

More specifically, the microlens array 200 arranged on the substrate 300 may have a rotational symmetric structure which has a shape of arcs.

Figure 3:
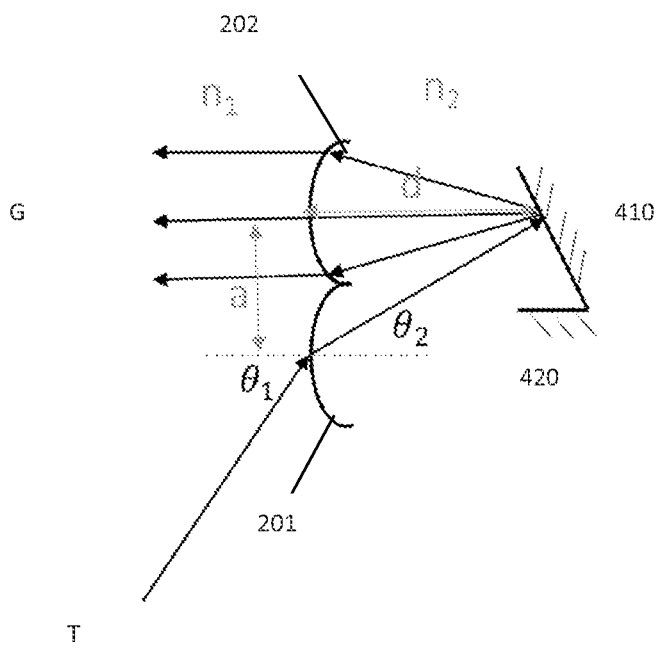
FIG. 3 is a principle diagram illustrating focusing of microlenses and annular Fresnel collimation according to the present disclosure.

FIG. 3 is a principle diagram of focusing of microlenses and annular Fresnel collimation according to the present disclosure. FIG. 3 illustrates:

an incident angle of the light emitted from the projector: $\theta_1$, an angle of the light emitted from the projector after being deflected by the microlens array: $\theta_2$, an interval between vertexes of two adjacent microlens units: a, a focal length of the microlens unit: d, a radius of curvature of the microlens unit: r, a refractive index of air: $n_1$, and a refractive index of the microlens: $n_2$.

The focal length d of the microlens unit can be obtained from the angle $\theta_2$ of the light emitted from the projector after being deflected by the microlens array and the interval a between the vertexes of the two adjacent microlens units:

$$d = a/\tan\theta_2 \qquad (1)$$

The radius of curvature r of the microlens unit is obtained based on the principle of geometric optics as below:

$$r = \frac{n_2}{n_2 - n_1} d \qquad (2)$$

Therefore, $$r = \frac{n_2 a}{(n_2 - n_1)\tan\theta_2} \qquad (3)$$

Regarding the above formulas (1)-(3), the radius of curvature r of the microlens unit is determined by the incident angle $\theta_1$ of the projection light, the interval a of two adjacent microlens units, and the focal length d of the microlens unit.

The incident angle $\theta_1$ of the projection light T changes based on the position of the projector. Therefore, the following situations may occur:

Situation 1: When the two adjacent microlens units has a constant interval a therebetween, d is variable, so that the radius of curvature r of the microlens unit is variable;

Situation 2: When the focal length d of the microlens unit is constant, the interval a of the two adjacent microlens units is variable, so that the radius of curvature r of the microlens unit is variable;

Combining the above two situations, the radius of curvature of the microlens unit is variable, that is, the microlens array may be configured in an aperiodic arrangement. This aperiodic microlens array structure also avoids diffraction or Moire pattern effects.

FIG. 3 illustrates two adjacent microlens units, i.e., a first microlens unit 201 and a second microlens unit 202. When the parallel projection light is incident to the first microlens unit 201 at the angle $\theta_1$, the first microlens unit 201 will converge the incident projection light onto the reflective layer 410 of the Fresnel microstructure. A light beam incident at the center of the first microlens unit 201 is defined as a principal light beam of the light incident at the microlens, and the reflective layer 410 of the Fresnel microstructure is configured to be a mirror surface. According to the reflection principle of the Fresnel microstructure, the reflected principal light beam is collimated by the reflective layer 410 into a light beam that is emitted in a horizontal direction and reflected back to the viewer's field of view; other parallel light beams surrounding the principal light beam are reflected into reflected light beams at a small divergence angle around the principal light beam; and a reflectivity of the reflective surface of the reflective layer can be controlled by adjusting the content of reflective particles in the coating material, and the reflectivity may be generally controlled within a range of 20% to 90%. The usage of a reflective coating material with high reflectivity can effectively increase the gain of the screen.

If the reflective surface of the Fresnel reflective layer has a certain degree of roughness, the reflected light will be further scattered on the rough reflective surface, which will further expand the diffusion angle of the reflected light. Therefore, the roughness degree of the reflective surface can be controlled to control the divergence of the reflected light. Too large roughness will excessively diffuse the light emitted from the projector and reduce the gain at the center of the projector. The diffusion angle may be controlled generally within a range of 0° to 40°.

The arrangement of the microlens units can make the reflected light to be located at a position of the focal plane of the corresponding microlens unit, such that the divergent reflected light will be collimated again by the adjacent microlens unit, thereby increasing the gain of the screen.

FIG. 4 is a principle diagram of improving contrast according to the present disclosure. Regarding the above description, the projection light T is focused on the reflective layers 410 by the microlens array 200 and then reflected into the viewer's field of view G. A first part of the ambient light H1 is incident to the light-absorbing layer of the Fresnel microstructure and absorbed, and a second part of the ambient light H2 is incident on the reflective layer 410 and reflected, as shown in FIG. 4. Since the absorption rate of the light-absorbing layer is not 100%, a part of the ambient light incident on the light-absorbing layer may be reflected back to the viewer's field of view.

A reflectivity $r_{coating}$ of the reflective material of the reflective layer in the present disclosure may be greater than 60%. The projection light are converged on the reflective material through the microlenses, and most of the projection light is reflected by the reflective material. Considering the dimension of the reflective layer, if a % of the ambient light is directly incident on the reflective material, (1−a %) of the ambient light is reflected at a reflectivity $r_{abs}$ ($r_{abs}$<5%) of the absorbing material of the light-absorbing layer. In this case, an anti-ambient light contrast w of the screen in the present disclosure is:

$$\omega = \frac{G(\text{gain of a projector})}{a\ \% \times r_{coating} + (1 - a\ \%) \times r_{abs}} \qquad (4)$$

If an area ratio of the reflective material to the Fresnel microstructure is 10%, the reflectivity of the reflective material is 60%, the reflectivity of the light-absorbing material is 5%, and the gain of the projector is about 2.0-3.0, then the anti-ambient light contrast is about 20. It can be seen from the formula (4) that the microlens array is provided to not only improve the utilization of the projection light, but also have good performance against ambient light, thereby obtaining the anti-ambient light contrast much higher than that of common screens.

Five processing methods of the projection screen are described in detail below.

A first processing method is described as below.

FIGS. 5(*a*) to 5(*d*) are schematic diagrams of the first processing method according to the present disclosure. As shown in FIGS. 5(*a*) to 5(*d*), the present disclosure provides a method for processing the projection screen as described above that includes:

forming a microlens array, which includes processing the microlens array on a transparent substrate by using an ion exchange process, a photosensitive glass process, a holographic process, an Fresnel zone lens process, or a photoresist-thermal fusion process;

forming an Fresnel reflective structure, which includes forming the Fresnel microstructure, by an imprinting process or UV glue transferring process, on a side of the transparent substrate that is opposite to another side of the transparent substrate where the microlens array is formed, uniformly coating a preformed white reflective coating material on a surface of the Fresnel microstructure, then irradiating the white reflective coating material with light beams to cure a part of the white reflective coating material irradiated by the light beams, an irradiation direction of the light beams being orientated in an incident direction of light emitted from the projector, and removing another part of the reflective coating material that is not irradiated by the light beams; and forming the light-absorbing layers, which includes adding a black organic dye and an inorganic pigment in a UV glue, coating a formed black absorbing material on a part of the surface of the Fresnel microstructure where the another part of the white reflective coating material non-irradiated by the light beams is removed, and obtaining a main structure of the screen through light-curing. Specifically, the process for forming the screen structure of the present disclosure is described as below:

(1) Forming the microlens array: the common processing methods of microlens array can generally be used, such as an ion exchange process, a photosensitive glass method, a holographic method, a Fresnel zone lens method, or a photoresist-thermal fusion method. The above common processing method may be used to process the microlens array on the transparent substrate. The transparent substrate may be polycarbonate (PC) or acrylic plastic. As shown in FIG. 5(*a*), the pitch P of the microlens unit is about 100 μm.

Figure 5C:
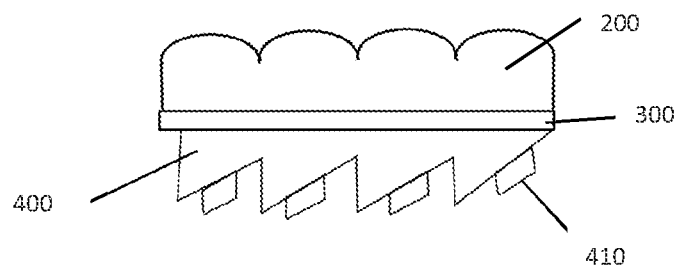
Figure 5D:
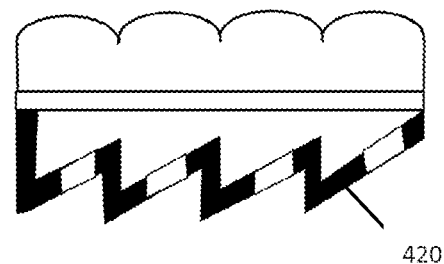

(2) Forming an Fresnel reflective structure: a ring-shaped Fresnel microstructure is formed by the imprinting process or UV glue transferring process on the side of the transparent substrate that is opposite to the another side of the transparent substrate, on which the microlens array is formed. The white reflective coating material is a mixture of reflective particles, diffusion particles, negative photoresist, adhesive glue and other auxiliary materials. The reflective material may be selected from mica, titanium dioxide ($TiO_2$) or other reflective materials, and the reflectivity thereof is greater than 60%. The diffusion particles may be epoxy, acrylic, silicone organic resin particles, or other inorganic scattering materials. The negative photoresist may be polycinnamic acid or cyclized rubber. Other auxiliary materials may include additives and solvents. The additives and solvents may include a mixture of a leveling agent, a wetting agent, a defoamer, and the like, which are mixed in a certain proportion, thereby increasing the coating effect; and a mixture of anhydrous acetone, anhydrous xylene, anhydrous cyclohexanone, anhydrous methyl ethyl ketone, ethyl acetate, anhydrous butyl acetate, and the like, which are mixed in a certain proportion. The preformed white reflective coating material is coated uniformly on the surface of the microstructure and then irradiated with the light beams. The light beams may be emitted by a UV lamp or blue light, etc., and the irradiation direction of the light beams is orientated in the incident direction of the light emitted from the projector, as shown in FIG. 5(*b*). Since the reflective paint contains negative photoresist, the irradiated reflective paint may be cured, and the reflective paint that has not been irradiated can be dissolved and removed after being processed by the developer, and to form the structure shown in FIG. 5(c).

(3) Forming the light-absorbing layers: the light-absorbing layer may be made of a black absorbing material. Specifically, a black organic dye (such as, aniline black) and an inorganic pigment (such as, carbon black, graphite, and metal oxide) are added to the UV glue. The formed black absorbing material is coated on the part of the surface of the Fresnel microstructure, from which the reflective coating material that is not irradiated by the light beams has been removed, as shown in FIG. 5(c). The absorbing material is then cured by light to form the main structure of the screen shown in FIG. 5(d).

A second processing method is described as below.

Figure 6A:
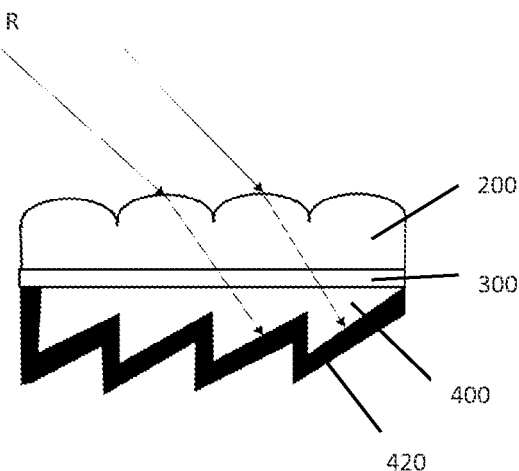
FIGS. 6(a) to 6(c) are schematic diagrams illustrating a second processing method according to the present disclosure.
Figure 6B:
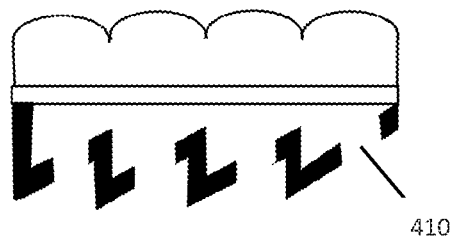
Figure 6C:
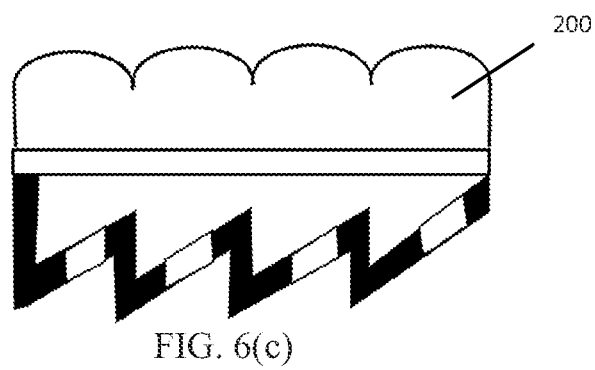

FIGS. 6(a) to 6(c) are schematic diagrams of the second processing method according to the present disclosure. As shown in FIGS. 6(a) to 6(c), the present disclosure also provides a method for processing the projection screen as described above, which includes:

forming a microlens array, which includes processing the microlens array on a transparent substrate by using an ion exchange process, a photosensitive glass process, a holographic process, an Fresnel zone lens process, or a photoresist-thermal fusion process;

forming an Fresnel reflective structure, which includes forming the Fresnel microstructure, by an imprinting process or UV glue transferring process, on a side of the transparent substrate that is opposite to another side of the transparent substrate where the microlens array is formed;

forming light-absorbing layers, which includes adding a black organic dye and an inorganic pigment in a UV glue, coating a formed black absorbing material on a surface of the Fresnel microstructure, and removing a part of the absorbing material irradiated by light beams and remaining another part of the absorbing material non-irradiated by the light beams to form the light-absorbing layers; and filling a reflective coating material between every two adjacent light-absorbing layers of the light-absorbing layers to obtain a main screen structure.

Specifically, this processing method is different from the first processing method in that this processing method adopts a positive photoresist light-curing process. That is, a positive photoresist is added to the black light-absorbing material and then coated uniformly on the surface of the microstructure, as shown in FIG. 6(a). After that, the light beams travel through the microlens array, and then focus and irradiate on a surface of the black light-absorbing material. The irradiated part of the black light-absorbing material can be dissolved after being processed by a developer and then removed, and the another part that is not irradiated by the light beams is retained, thereby forming the light-absorbing layers shown in FIG. 6(b). The reflective coating material is filled between the two adjacent light-absorbing layers to obtain the structure shown in FIG. 6(c).

A third processing method is described as below.

Figure 7:
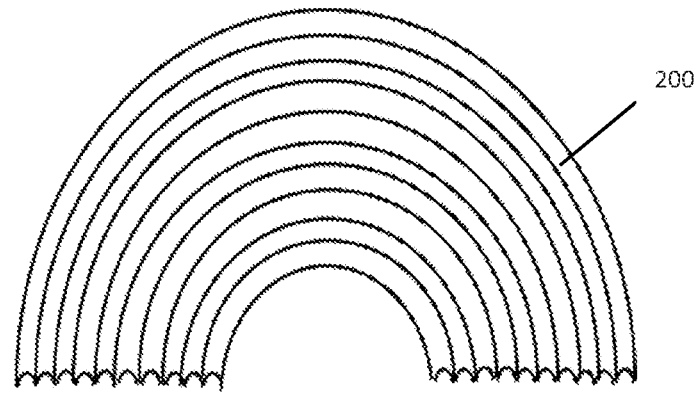
FIG. 7 is a schematic diagram illustrating a structure of a microlens array according to the present disclosure.

FIG. 7 is a schematic diagram of a structure of a microlens array according to the present disclosure. As shown in FIG. 7, the microlens array 200 formed on a transparent substrate 300 has a rotational symmetric structure with a shape of arcs in this processing method. However, it should be noted that in practical applications, the specific shape of the microlens array is not limited thereto, as long as the shape of the microlens that can focus the ultra-short focal projection light on the reflective layer falls within the scope of the present disclosure.

The other technical features of this processing method are the same as those of the first processing method, and the details thereof refer to the above description with respect to the first processing method and will not be repeated herein.

A fourth processing method is described as below.

Figure 8A:
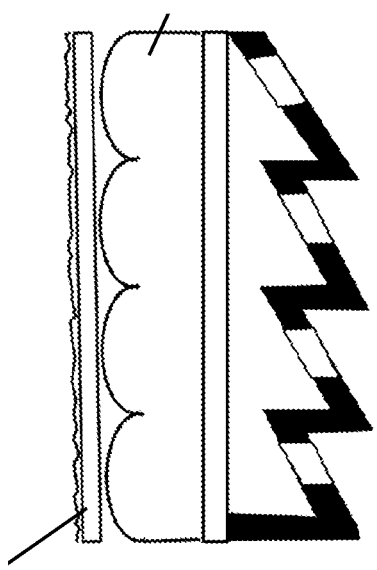
FIG. 8(a) is a schematic diagram illustrating a structure of a diffusion layer formed by using a fourth processing method according to the present disclosure.

FIG. 8(a) is a schematic diagram of a structure of a diffusion layer formed by the fourth processing method according to the present disclosure. As shown in FIG. 8(a), this processing method is an improvement on the basis of the first processing method or the second processing method. That is, after completing all the steps of the first processing method, the diffusion layer 100 is attached to a side of the microlens array close to the viewer so that the diffusion layer and the diffusion particles in the reflective coating function to increase the viewing angle. That is, the processing method provided by the present disclosure may further include attaching the diffusion layer 100 to the side of the microlens array close to the viewer, in order to achieve good results.

A fifth processing method is described as below.

Figure 8B:
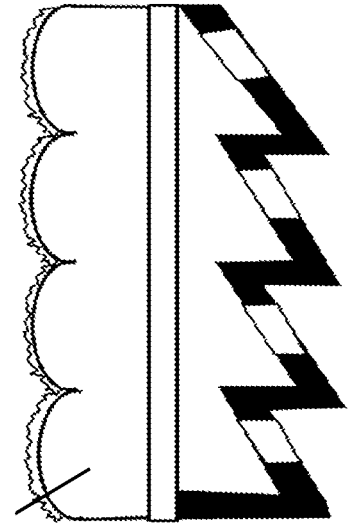
FIG. 8(b) is a schematic diagram illustrating a structure of a diffusion layer formed by using a fifth processing method according to the present disclosure.

FIG. 8(b) is a schematic diagram of a structure of a diffusion layer formed by the fifth processing method according to the present disclosure. As shown in FIG. 8(b), this processing method is also an improvement on the basis of the first processing method or the second processing method. That is, after completing all the steps of the first processing method, the lens surface of the microlens array 200 is directly roughened to form the diffusion layer 100.

To sum up, the present disclosure provides a projection screen and a processing method thereof. The projection screen includes the diffusion layer 100, the microlens array 200, and the substrate 300, which are arranged in sequence from the incident side of the projection light T. The inner side of the substrate 300 is provided with the Fresnel microstructure 400, and a part of the surface of the Fresnel microstructure 400 is provided with the reflecting layers 410, and the remaining part of the surface of the Fresnel microstructure 400 is provided with the light-absorbing layers 420. The microlens array 200 is configured to focus the projection light T on the reflecting layers 410. The reflecting layers 410 are configured to reflect the projection light T back to the field of view G of viewers. The ambient light H is mostly absorbed by the light-absorbing layers 420. In the present disclosure, the structure and dimension of the microlens array is configured to be enable the projection light to be only incident onto the reflecting layers of the Fresnel microstructure and the ambient light to be mostly absorbed by the light-absorbing layers, thereby improving the light utilization and the anti-ambient light capability of the projection screen, and reducing the reflectivity of the projection screen without reducing the reflectivity of the projector. Accordingly, the projection screen has high gain and high contrast, and is suitable for an ultra-short-focus projector, to ensure that the projection screen has a good visual effect.

The invention claimed is:

1. A projection screen comprising a diffusion layer, a microlens array, and a substrate that are arranged sequentially from an incident side of projection light,
   wherein an inner side of the substrate is provided with an Fresnel microstructure, a part of a surface of the Fresnel microstructure is provided with reflective layers, and a remaining part of the surface of the Fresnel microstructure is provided with light-absorbing layers, and wherein the microlens array is configured to focus the projection light on the reflective layers, and the reflective layers are configured to reflect the projection light back to a field of view of a viewer.

2. The projection screen according to claim 1, wherein one of the reflective layers is provided between two adjacent light-absorbing layers of the light-absorbing layers.

3. The projection screen according to claim 1, wherein the microlens array comprises a plurality of microlens units, and each of the reflective layers is arranged at a position corresponding to a focal plane of one of the plurality of microlens units, such that the reflected light is capable of being located at a position of the focal plane of the corresponding microlens unit.

4. The projection screen according to claim 3, wherein assuming that a denotes an interval between vertexes of two adjacent microlens units of the plurality of microlens units, d denotes a focal length of each of the microlens units, and r denotes a radius of curvature of the microlens unit,
when a is constant, d is variable and r is variable; or
when d is constant, a is variable and r is variable.

5. The projection screen according to claim 4, wherein the microlens array is configured in an aperiodic arrangement.

6. The projection screen according to claim 3, wherein a pitch (P) of each of the plurality of microlens units of the microlens array is 100 μm.

7. The projection screen according to claim 1, wherein the microlens array arranged on the substrate has a rotational symmetric structure which has a shape of arcs.

8. The projection screen according to claim 1, wherein the diffusion layer is attached to an outer side of the microlens array.

9. The projection screen according to claim 1, wherein an outer side of the microlens array is roughened to form the diffusion layer.

10. A processing method for the projection screen according to claim 1, comprising:
forming the microlens array, which comprises processing the microlens array on a transparent substrate by using an ion exchange process, a photosensitive glass process, a holographic process, an Fresnel zone lens process, or a photoresist-thermal fusion process;
forming an Fresnel reflective structure, which comprises forming the Fresnel microstructure, by an imprinting process or UV glue transferring process, on a side of the transparent substrate that is opposite to another side of the transparent substrate where the microlens array is formed, uniformly coating a preformed white reflective coating material on a surface of the Fresnel microstructure, then irradiating the white reflective coating material with light beams to cure a part of the white reflective coating material irradiated by the light beams, an irradiation direction of the light beams being orientated in an incident direction of light emitted from a projector, and removing another part of the white reflective coating material that is not irradiated by the light beams; and
forming the light-absorbing layers, which comprises adding a black organic dye and an inorganic pigment in a UV glue, coating a formed black absorbing material on the surface of the Fresnel microstructure where the another part of the white reflective coating material non-irradiated by the light beams is removed, and obtaining a main structure of the projection screen through light-curing.

11. The processing method according to claim 10, further comprising:
attaching the diffusion layer to a side of the microlens array close to the viewer, or directly roughening a lens surface of the microlens array to form the diffusion layer.

12. The processing method according to claim 10, wherein one of the reflective layers is provided between two adjacent light-absorbing layers of the light-absorbing layers.

13. A processing method for the projection screen according to claim 1, comprising:
forming the microlens array, which comprises processing the microlens array on a transparent substrate by using an ion exchange process, a photosensitive glass process, a holographic process, an Fresnel zone lens process, or a photoresist-thermal fusion process;
forming an Fresnel reflective structure, which comprises forming the Fresnel microstructure, by an imprinting process or UV glue transferring process, on a side of the transparent substrate that is opposite to another side of the transparent substrate where the microlens array is formed;
forming light-absorbing layers, which comprises adding a black organic dye and an inorganic pigment in a UV glue, coating a formed black absorbing material on a surface of the Fresnel microstructure, and removing a part of the black absorbing material irradiated by light beams and remaining another part of the black absorbing material that is not irradiated by the light beams, to form the light-absorbing layers; and
filling a reflective coating material between every two adjacent light-absorbing layers of the light-absorbing layers to obtain a main structure of the projection screen.

14. The processing method according to claim 13, further comprising:
attaching the diffusion layer to a side of the microlens array close to the viewer, or directly roughening a lens surface of the microlens array, to form the diffusion layer.

15. The processing method according to claim 13, wherein the microlens array comprises a plurality of microlens units, and each of the reflective layers is arranged at a position corresponding to a focal plane of one of the plurality of microlens units.

16. The projection screen according to claim 1, wherein each of the reflective layers is a white reflective coating material that comprises reflective particles, diffusion particles, negative photoresist, adhesive glue, and auxiliary material.

17. The projection screen according to claim 16, wherein a reflectivity of a reflective surface of each of the reflective layers is controlled by adjusting a content of the reflective particles in the white reflective coating material.

18. The projection screen according to claim 1, wherein each of the light-absorbing layers comprises UV glue, and the UV glue comprises black organic dye and inorganic pigment.

* * * * *